United States Patent [19]
Haider et al.

[11] Patent Number: 5,990,340
[45] Date of Patent: Nov. 23, 1999

[54] POLYURETHANE POLYOLEFINS AND PREPOLYMERS BASED ON HYDROXY FUNCTIONAL POLYBUTADIENE

[75] Inventors: Karl W. Haider, McKees Rocks; Jack C. Chan, Coraopolis, both of Pa.; E. Haakan Jonsson, Cologne, Germany; Uli W. Franz; Mark A. Peters, both of Moon Township, Pa.; Ronald P. Taylor, Coraopolis, Pa.

[73] Assignee: Bayer Corporation, Pittsburgh, Pa.

[21] Appl. No.: 09/223,167

[22] Filed: Dec. 30, 1998

Related U.S. Application Data

[62] Division of application No. 08/999,218, Dec. 29, 1997, abandoned.

[51] Int. Cl.⁶ .......................... C07C 271/08; C08G 18/67
[52] U.S. Cl. .............................. 560/25; 528/59; 528/75; 560/26; 560/115; 560/158; 560/330
[58] Field of Search .................... 528/59, 75; 560/25, 560/26, 115, 158, 330

[56] References Cited

U.S. PATENT DOCUMENTS

| | | |
|---|---|---|
| 3,941,909 | 3/1976 | Schoer et al. ............................ 156/315 |
| 3,963,681 | 6/1976 | Kaneko et al. ............................ 528/61 |
| 5,247,023 | 9/1993 | Chung et al. ............................ 525/288 |
| 5,403,904 | 4/1995 | Nubel et al. ............................ 526/139 |
| 5,512,635 | 4/1996 | Nubel et al. ............................ 525/247 |
| 5,519,101 | 5/1996 | Nubel et al. ............................ 526/142 |
| 5,559,190 | 9/1996 | Nubel et al. ............................ 525/270 |
| 5,589,543 | 12/1996 | Yokelson et al. ........................ 525/131 |
| 5,589,548 | 12/1996 | Nubel et al. ............................ 525/247 |
| 5,728,917 | 3/1998 | Grubbs et al. ............................ 585/653 |
| 5,750,815 | 5/1998 | Grubbs et al. ............................ 585/511 |
| 5,849,851 | 12/1998 | Grubbs et al. ............................ 526/93 |

*Primary Examiner*—Rabon Sergent
*Attorney, Agent, or Firm*—Joseph C. Gil; Noland J. Cheung

[57] ABSTRACT

A di-hydroxy-functionalized linear non-crosslinked polyolefin is disclosed having no pendant chain-branched groups which is prepared by reacting 1,4-diacetoxy-2-butene with 1,5-cyclooctadiene in the presence of a catalyst comprising a ruthenium metal carbene complex, characterized in that the functionality number of said polyolefin as determined by NMR is 2.0 and the viscosity of said polyolefin ranges from about 800 to 16000 mPa.s @25° C. at a number average molecular weight ranging from 2,600 to 6,500 g/mole. A prepolymer comprising the reaction of a polyisocyanate with the polyolefin is also disclosed.

3 Claims, 1 Drawing Sheet

POLYURETHANE POLYOLEFINS AND PREPOLYMERS BASED ON HYDROXY FUNCTIONAL POLYBUTADIENE

This is a Divisional application of Ser. No. 08/999,218, files Dec. 29,1997 now abandoned.

FIELD OF THE INVENTION

The present invention relates to a low viscosity polyurethane polyolefin and prepolymer based on a hydroxy functional polybutadiene characterized in that said polyolefin or prepolymer has low viscosity.

BACKGROUND OF THE INVENTION

Polyurethane prepolymers from polyisocyanates and polybutadiene polyols can be used to prepare hydrophobic polyurethane articles. The prepolymers, however, generally have high viscosity, which makes such prepolymers less desirable for applications requiring low viscosity prepolymers (e.g., potting resins, highly filled systems). Isocyanate terminated prepolymers are described in Kaneko, et al. (U.S. Pat. No. 3,963,681). The prepolymers may be cured with aromatic or aliphatic polyalcohols or polyamines to form polyurethane or polyurethane/polyurea elastomeric articles.

Generally, the use of a polybutadiene having functional groups at both chain ends ("telechelic polymers") is known. It is also known to use, as a polyolefin, a difunctional telechelic linear non-crosslinked polybutadiene without pendant chain groups.

A method for producing such a polyolefin is disclosed in Chung, et al. (U.S. Pat. No. 5,247,023) which discloses the use of a borane chain transfer agent and the subsequent transformation of the borane moeity into an alcohol.

The use of a catalyst system consisting of tungsten hexachloride and tetramethyltin for the preparation of polybutadiene is disclosed in Nubel, et al. (U.S. Pat. Nos. 5,512,635, 5,559,190, 5,519,101 and 5,403,904).

In Nubel, et al. (U.S. Pat. No. 5,589,548), a polybutadiene is disclosed which is produced by the ring-opening polymerization of cycloolefins with a tungsten hexachloride and tetramethyltin catalyst and the use of dimethyl-10-eicosene-1,20-dioate(DMED) as a chain transfer agent. Generally, such polyolefins result in high viscosity polyolefins, which are not suitable for the above-mentioned applications. Furthermore, Nubel. et al. (U.S. Pat. No. 5,589,548) discloses a chain transfer agent where the unsaturation is far removed from the functional group, a polymer with functionality on both polymer chain ends can be synthesized. We have found, however, in the present invention that ruthenium-based catalysts are more tolerant of functionality and can utilize chain transfer agents where the functional group is only one (1) carbon atom removed from the unsaturation.

A polyurethane elastomer prepared from a hydrophobic difunctional polyol is disclosed in Yorkelson, et al. (U.S. Pat. No. 5,589,543).

SUMMARY OF THE INVENTION

The present invention relates to a di-hydroxy-functionalized linear non-crosslinked polyolefin without pendant chain-branched groups prepared by reacting 1,4-diacetoxy-2-butene with 1,5-cyclooctadiene in the presence of a catalyst comprising a ruthenium metal carbene complex, characterized in that the functionality of said polyolefin as determined by NMR is 2.0 and the viscosity of said polyolefin ranges from about 800 to 16,000 mpa.s at a number average molecular weight ranging from 2600 to 6500 g/mole. The present invention also relates to a prepolymer comprising the reaction of a polyisocyanate with the above-mentioned polyolefin.

DETAILED DESCRIPTION OF THE INVENTION

Figure 1:
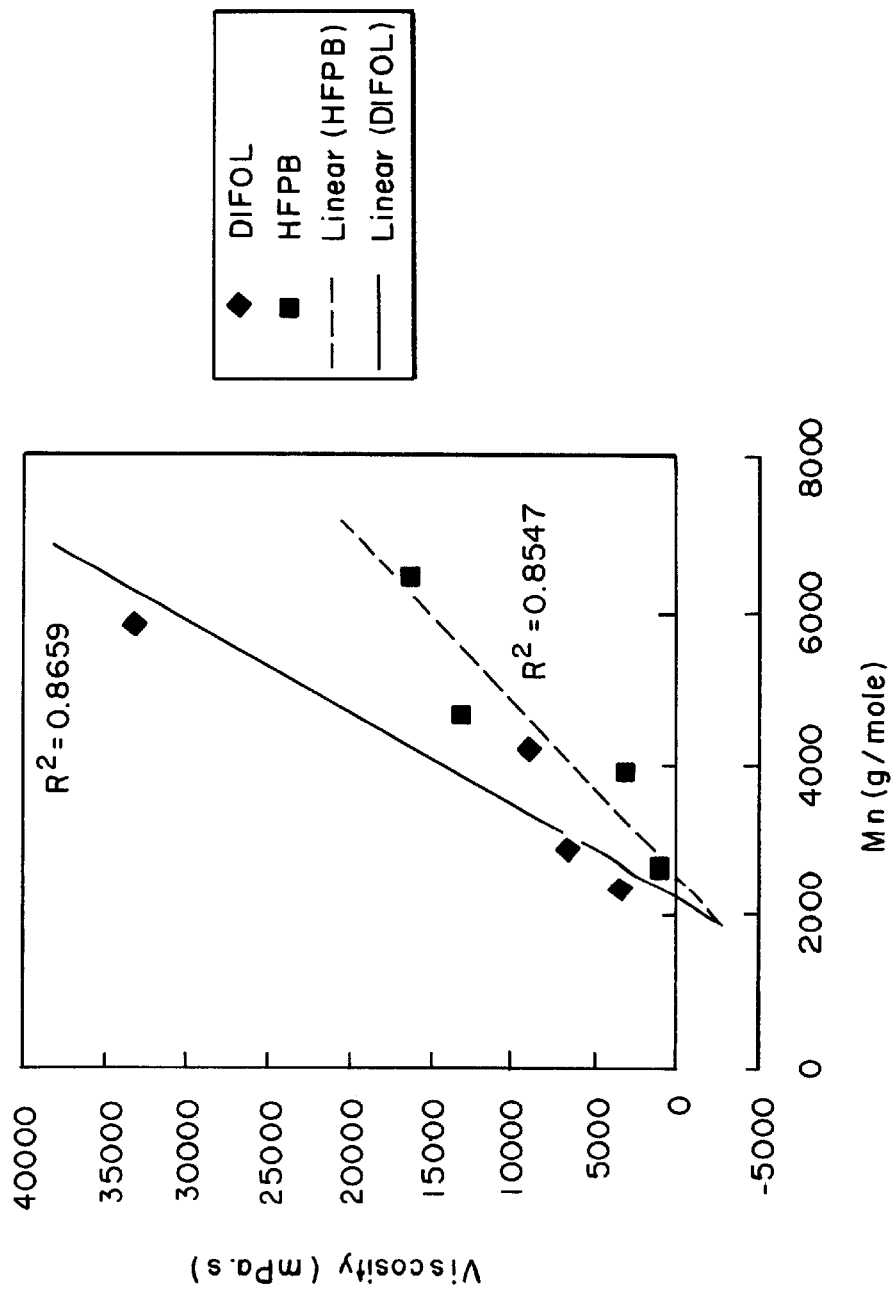
FIG. 1 shows a graph of the effect of the chain transfer structure on the viscosity of the polymer.

The present invention relates to the preparation of an end-functionalized linear non-crosslinked polyolefin without pendant chain-branched groups and a prepolymer comprising such a polyolefin. The process comprises the reaction of a chain transfer agent with a cyclic olefin in the presence of a catalyst to form the desired polyolefin.

In particular, the polyolefin is a hydroxyl-functionalized polybutadiene (HFPB), which is made via the above-mentioned process ("Ring Opening Metathesis Polymerization ('ROMP')").

The synthesis of HFPB requires a chain transfer agent (CTA), which serves to add functionality (hydroxyl groups) to the polymer chain ends. The use of the CTA is dependent on the type of ROMP catalyst used. In the present invention, the most preferred chain transfer agent is 1,4-diacetoxy-2-butene. Accordingly, such a chain transfer agent is only useful with Ruthenium based metathesis catalysts and has a dramatic influence on the viscosity of the polybutadiene diol.

In the present invention, preferred cyclic olefins are cyclobutenes and cyclooctadienes and the most preferred cyclic olefin is 1,5-cyclooctadiene, which is most preferably, reacted with 1,4-diacetoxy-2-butene in the presence of a catalyst to form the present HFPB. The HFPB, which results from this process, has the structure

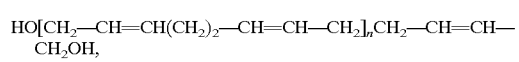

HO[CH$_2$—CH=CH(CH$_2$)$_2$—CH=CH—CH$_2$]$_n$CH$_2$—CH=CH—CH$_2$OH, wherein n is a number average value of up to 1000.

The catalysts which can be used in the present invention and their preparation, are described in the patent assigned to the California Institute of Technology, Grubbs, et al. (U.S. Pat. No. 5,342,909). In a preferred embodiment, the catalyst required in the present invention is a Ruthenium metal carbene complex based compound. In a most preferred embodiment, the catalyst is bis(tricyclohexylphosphine)benzylidine-Ruthenium dichloride.

The polyolefins of the present invention have unique physical properties because of the linearity, absence of crosslinking, low polydispersity and unsaturation and are capable of providing these properties to unsaturated polymeric compounds.

The HFPB polyolefin of the present invention has a viscosity ranging from 500 to 40,000 mpa.s, and most preferably from 800 to 16,000 mPa.s. The functionality of such a polyolefin ranges from 1.8 to 2.2 and most preferably is 2.0. The number average molecular weight of the HFPB ranges from 500 to 200,000 g/mole and most preferably from 2,600 to 6,500 g/mole.

The polyolefin of this invention is also useful in preparing a low viscosity prepolymer. These prepolymers, which may be used as the polyisocyanate component in accordance with the present invention, are prepared from monomeric polyisocyanates or polyisocyanate adducts, preferably monomeric diisocyanates, and the polyolefin, HFPB, of the present invention.

The prepolymers of the present invention most preferably have an average functionality of 2 to 2.5, and most preferably 2.0. Additionally, the prepolymers preferably have an NCO content ranging from 3 to 20%, and most preferably 4 to 10%. Finally, the prepolymers preferably have a viscosity ranging from 500 to 20,000 mPa.s @25° C. and most preferably from 1000 to 10,000 MPa.s @25° C.

Suitable monomeric diisocyanates may be represented by the formula

R(NCO)$_2$ in which R represents an organic group. The molecular weight of these diisocyanates is about 112 to 1,000, preferably about 140 to 400 and more preferably 174 to 300. Diisocyanates preferred for the process according to the invention are those in which R represents a divalent aliphatic hydrocarbon group having 4 to 40, preferably 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-iso-cyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl4(3)-isocyanatomethyl cyclohexane, 2,4- and/or 2,6-hexahydrotoluylene diisocyanate, 1,3- and/or 1,4-phenylene diisocyanate, 2,4-diisocyanatotoluene (and mixtures thereof with preferably up to 35 wt. %, based on the mixture, of 2,6-diisocyanatotoluene), 4,4'-diphenylmethane diisocyanate (and mixtures thereof with 2,4'-diphenyl-methane diisocyanate and/or 2,2'-diphenylmethane diisocyanate), 1,5-diisocyanato naphthalene and mixtures thereof.

Polyisocyanates containing 3 or more isocyanate groups such as 4-isocyanantomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be used.

Preferred organic diisocyanates include 1,6-hexamethylene diisocyanate, 1-isocyanato-3-isocyanatomethyl-3,5,5-trimethylcyclohexane (isophorone diisocyanate or IPDI), bis-(4-isocyanatocyclohexyl)-methane, 1-isocyanato-1-methyl4(3)-isocyanatomethyl cyclohexane, 2,4- and/or 2,6-toluylene diisocyanate, and 2,4- diphenylmethane diisocyanate. Most preferably, 4,4'-diphenylmethane diisocyanate and 4,4'-dicyclohexylmethane diisocyanate are used.

Of course, the prepolymer of the present invention may include catalysts, plasticizers, light stabilizers, and antioxidants.

The prepolymer of the present invention can be used for casting polyurethane or polyurethane urea articles for use for example in elastomers, sealants, coatings, encapsulants, and binders.

The invention is further illustrated but is not intended to be limited by the following examples in which all parts and percentages are by weight unless otherwise specified.

EXAMPLES

Example 1

A reactor is cleaned, dried, and filled with nitrogen. The chain transfer agent, 1,4-diacetoxy-2-butene (154 g, 1.8 moles), is distilled and added to the reactor. 1,5-cyclooctadiene (99%, unstabilized, 1760 g, 32.5 moles) is added to the reactor and nitrogen is bubbled through the solution for 30 minutes. The catalyst, bis (tricyclohexylphosphine)benylidene-Ruthenium dichloride (3.06 9, 3.7 mmole) is dissolved in a minimal amount of dichloromethane under a nitrogen blanket and added to the reaction. The reaction is slowly heated to 50° C. The reaction is mildly exothermic and so cooling is used to control the reaction temperature. After 8 h, vinyl acetate (0.625 g, 7.3 mmole) is added to the reaction to kill the catalyst. The mixture is stirred for an hour and cooled to 25° C. Conversion of monomer to polymer was >98% based on results from NMR of the unpurified product. The polymer is precipitated into methanol (6 L) containing hydrochloric acid (1 N, 500 mL and stirred for 1 hour. The methanol solution is decanted and the polymer is again precipitated into methanol (6 L) containing hydrochloric acid (500 mL, 1 N) and stirred for an hour. The methanol layer is removed and the polymer is then precipitated into methanol (4 L) three times.

The polymer is dissolved in tetrahydrofuran (4 L) and placed into a reactor which is cooled to 0° C. Sodium methoxide (809 g, 3.7 moles, 25 wt. % in methanol) is added dropwise over a period of 40 minutes and the mixture is stirred at 0° C. for 5 hours. The reaction is warmed to 25° C. and precipitated into methanol (6 L) containing concentrated hydrochloric acid (pH is the controlled to maintain 4 to 5). The methanol solution is then decanted and the polymer solution is precipitated into methanol (6 L) containing hydrochloric acid (500 mL, 1 N), washed three times with 6 L of methanol containing 500 mL of water and then washed 2 times with 6 L of methanol. The methanol layer is removed via decantation. The polymer is then further purified by removing excess solvent via vacuum distillation.

The molecular weight of this polymer, measured via gel permeation chromatography, is 2600 g/mole measured versus polypropylene glycol standards. The viscosity of this polymer is measured to be 800 mPa.s @25° C.

Example 2

The same procedure described in Example 1 is used except the amount of 1,4-diacetoxy-2-butene was reduced (155 g, 0.9 moles).

Molecular weight of this polymer measured via gel permeation chromatography is 4710 g/mole measured versus polypropylene glycol standards. The viscosity of this polymer is measured to be 13,000 mPa.s @25° C.

Example 3

The same procedure described in Example 1 is used except the amount of 1,4-diacetoxy-2-butene was reduced (103 g, 0.6 moles).

Molecular weight of this polymer measured via gel permeation chromatography is 6500 g/mole measured versus polypropylene glycol standards. The viscosity of this polymer is measured to be 16,000 mpa.s @25° C.

Example 4

Synthesis of HFPB using tungsten (VI) chloride catalyst 1,4-diacetoxy-2-butene (2.9 g, 16.9 mmole), 1,5-cyclooctadiene (44.3 g, 410 mmole), and chlorobenzene were added to a clean reactor and purged with nitrogen for 30 minutes. To a second flask was added tungsten (VI) chloride (the catalyst disclosed in Nubel, et al.) under an inert atmosphere. The chlorobenzene solution was transferred via cannula to the catalyst flask, tetramethyl tin was added after 15 minutes, and the reaction was heated to 100° C. After 24h, the reaction was cooled to room temperature and the polymer was precipitated into methanol. A viscous oil (4.8 g, 10% yield) was recovered. The molecular weight of this polymer via gel permeation chromatography was 4900 g/mole but there was no indication of acetoxy end groups via 1H NMR.

Example 5

Synthesis of HFPB using aryloxo tungsten (VI)

The same procedure as shown in Example 4 was used except that a different tungsten catalyst was used. Tungsten (VI) chloride and tetramethyl tin were replaced with bis(2, 6-diphenylphenoxy)tungsten (VI) tetrachloride (supplied by Professor Ken Wagener at the University of Florida synthesized according to literature Quinard, F.; Leconte, M.; Basset, J.-M.; Hsu, L.-Y; Alexander, J. J.; Shore, S. G. Inorg. Chem. 1987,26,4272. and Quinard, F.; Leconte, M.; Basset, J.-M. J. Mol. Catal. 1986, 36, 13.) and tetrabutyl tin in the same proportions. The polymerization yielded 10% conversion based on NMR and no observable end groups.

FIG. 1 shows the effect of the chain transfer structure on the viscosity of the polymer. The materials made by Nubel, et al. designated as DIFOL utilize a dimethyl-10-eicosene-1,20-dioate (DMED) chain transfer agent whereby the unsaturation is separated from the ester functionality by 9 carbons. These esters are then transesterified with hexanediol to convert them into hydroxyl moieties. The unsaturation is then further removed by an additional 8 atoms. Materials (designated as HFPB) made in the examples herein, utilize a chain transfer agent (1,4-diacetoxy-2-butene (DAB)) wherein the functionality is only 1 carbon away from the unsaturation. When the viscosity of the materials made using DMED (DIFOL) is compared to the materials made with DAB (HFPB) at the same relative molecular weight, the materials made with DAB are significantly lower in viscosity over a broad molecular weight range.

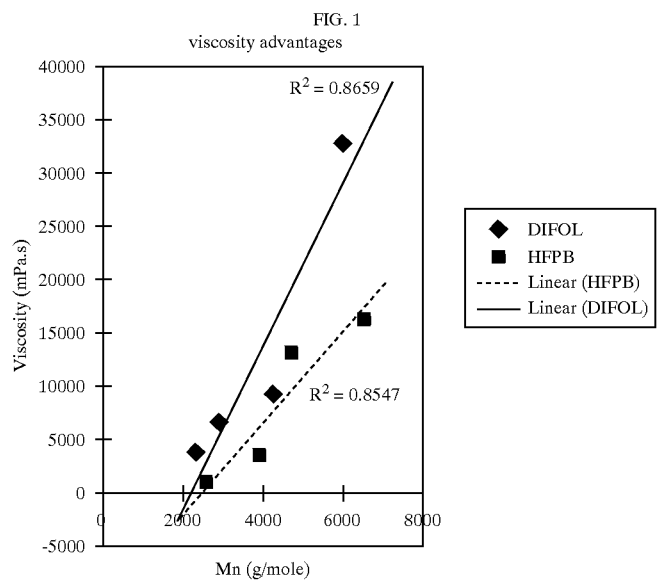

FIG. 1
viscosity advantages

Example 6

1) ISO 1: 4,4'-diphenylmethane diisocyanate
2) ISO 2: 4,4'-dicyclohexylmethane diisocyanate having the following isomer distribution: ~20% by wt. of the trans, trans-isomer, ~45 % by wt. of the cis,trans-isomer and ~35 % by wt. of the cis,cis-isomer.
3) Poly-BD: 1,2 and 1,4 polybutadiene available from Elf-Atochem with a functionality of 2.5 and an OH number of 48 mg KOH/g.
4) HFPB: a hydroxyl-functionalized polybutadiene of the present invention having an OH number of 52 mg KOH/g.

Example 6a

ISO 1 (290.5 g; 2.32 eq.) was warmed to 60° C. and poured into a 3-necked flask equipped with an overhead stirrer, thermocouple, and a vacuum adapter. The isocyanate was stirred at 60° C., as Poly-BD (710.2 g; 0.604 eq.) was added (pre-heated to 60° C.) to the reactor. The mixture was allowed to stir as the temperature of the reaction mixture was increased to 80° C. The reaction flask was evacuated (<0.1 mm HG) and held at 80° C. for 3 to 4 hours. An aliquot of the prepolymer was withdrawn and titrated for isocyanate content using standard n-butyl amine titration. The isocyanate content was found to be 6.8%.

Examples 6b–d

Examples 6b–d were prepared by a procedure analogous to 6a using the formulations as described in Table 1 below.

TABLE 1

| Example | Isocyanate Type (g; eq.) | Polyol Type (g; eq.) | NCO Content (%) | Viscosity @ 25° C. (mPa · s) | Viscosity @ 80° C. (mPa · s) |
|---|---|---|---|---|---|
| 6a | ISO 1 (290.5 g; 2.32 eq.) | Poly-BD (710.2 g; 0.604 eq.) | 6.8 | 28,000 | 2,600 |
| 6b | ISO 1 (130.5 g; 1.04 eq.) | HFPB (317.3 g; 0.294 eq.) | 7.0 | 2,420 | 350 |
| 6c* | ISO 2 (10.7 g; 0.0816 eq.) | Poly BD (24.9 g; 0.0212 eq.) | 6.9 | 40,500 | 3,150 |
| 6d* | ISO 2 (11.0 g; 0.0838 eq.) | HFPB (24.9 g; 0.0231 eq.) | 7.2 | 3,050 | 475 |

*Dibutyltin dilaurate (25 ppm) was added as a 1% solution in the polyol before increasing the reaction temperature to 80° C.

In comparison to a commercially available material (Poly-BD), prepolymers made with HFPB have nearly a ten-fold decrease in viscosity. The low viscosity is related to the viscosity of the starting polybutadiene diol and the functionality of this diol.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An NCO terminated prepolymer comprising the reaction of a polyisocyanate with an end-functionalized linear non-crosslinked polyolefin wherein said polyolefin has a molecular structure of $$HO_n-CH_2CH=CH-CH_2OH$$

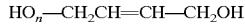

wherein n is a number average value of from 19 to 60, said polyolefin prepared by reacting 1,4-diacetoxy-2-butene with 1,5-cyclooctadiene in the presence of a catalyst comprising a ruthenium metal carbene complex, characterized in that the functionality number of said polyolefin as determined by NMR is 2.0 and the viscosity of said polyolefin ranges from about 800 to 16,000 mPa.s at a temperature of 25° C.

2. An NCO terminated prepolymer according to claim 1 wherein said catalyst is bis(tricyclohexylphosphine)benzylidine-ruthenium dichloride.

3. An NCO terminated prepolymer according to claim 1 wherein said prepolymer has a functionality of 2.0, an NCO content ranging from 4 to 10 wt. % and a viscosity ranging from about 500 to 20,000 mPa.s @25°C.

* * * * *

UNITED STATES PATENT AND TRADEMARK OFFICE
CERTIFICATE OF CORRECTION

PATENT NO. : 5,990,340  
DATED : November 23, 1999  
INVENTOR(S) : Karl W. Haider et al.

Page 1 of 1

It is certified that error appears in the above-identified patent and that said Letters Patent is hereby corrected as shown below:

<u>Column 7,</u>  
Line 31, delete the formula and substitute:  
-- $HO[CH_2\text{-}CH\text{=}CH(CH_2)_2\text{-}CH\text{=}CH\text{-}CH_2]_n CH_2\text{-}CH\text{=}CH\text{-}CH_2OH$ --.

Signed and Sealed this

Sixth Day of June, 2006

JON W. DUDAS  
*Director of the United States Patent and Trademark Office*